US006531951B2

(12) United States Patent
Serban et al.

(10) Patent No.: US 6,531,951 B2
(45) Date of Patent: Mar. 11, 2003

(54) FORCE SENSOR

(75) Inventors: Bogdan Serban, Niederkorn (LU); Aloyse Schoos, Bertrange (LU); Emmanuel Huegens, Arlon (BE)

(73) Assignee: I.E.E. International Electronics & Engineering S.a.r.l., Luxembourg (LU)

( * ) Notice: Subject to any disclaimer, the term of this patent is extended or adjusted under 35 U.S.C. 154(b) by 0 days.

(21) Appl. No.: 09/801,666

(22) Filed: Mar. 9, 2001

(65) Prior Publication Data

US 2001/0008389 A1 Jul. 19, 2001

Related U.S. Application Data

(63) Continuation of application No. PCT/EP99/06593, filed on Sep. 7, 1999.

(30) Foreign Application Priority Data

Sep. 11, 1998 (LU) .......................................... LU 90286

(51) Int. Cl.[7] .............................................. H01L 10/10
(52) U.S. Cl. ........................... 338/47; 338/99; 338/101
(58) Field of Search ........................... 338/47, 99, 101, 338/113, 114; 357/26

(56) References Cited

U.S. PATENT DOCUMENTS

| | | | | |
|---|---|---|---|---|
| 3,845,261 A | * | 10/1974 | Blinkilde ................. 200/85 A |
| 3,971,610 A | * | 7/1976 | Buchoff et al. ........... 339/17 R |
| 3,988,556 A | * | 10/1976 | Hyodo ..................... 200/264 |
| 4,314,227 A | | 2/1982 | Eventoff .................... 338/99 |
| 4,317,012 A | * | 2/1982 | Itoh ......................... 200/5 A |
| 4,856,993 A | | 8/1989 | Maness et al. .............. 433/68 |
| 5,296,837 A | | 3/1994 | Yaniger ...................... 338/47 |
| 5,563,354 A | * | 10/1996 | Kropp .................... 73/862.473 |

FOREIGN PATENT DOCUMENTS

| | | |
|---|---|---|
| EP | 0 649 518 B1 | 4/1998 |
| WO | WO 00/16053 | 3/2000 |

OTHER PUBLICATIONS

Form PCT/IPEA/416 (Notification of Transmittal of the International Preliminary Examination Report (PCT/EP99/06593) No date.
Form PCT/IPEA/409 (International Preliminary Examination Report) (PCT/EP99/06593) in the French language with attached English language translation of the Annex (i.e., the specification and claim replacement pages presented during the International stage). No date.
International Search Report for PCT/EP99/06593 No date.
Form PCT/IB/308 (Notice Informing The Applicant of the Communication of the International Application to the Designated Offices) (PCT/EP99/06593) No date.

* cited by examiner

*Primary Examiner*—Elvin Enad
*Assistant Examiner*—Kyung Lee
(74) *Attorney, Agent, or Firm*—Smith, Gambrell & Russell, LLP

(57) ABSTRACT

The invention concerns a force sensor (10) comprising a first electrode (22) and a second electrode (24) made of conductive material, which are arranged spaced from each other on a first insulating support (12). The invention is characterized in that a contact element (26) is conductive material is placed opposite the two electrodes and some distance therefrom, said contact element t(26) being pressed against said electrodes (22, 24) when a force is exerted on the pressure sensor (10) and at least one of the electrodes (22, 24) is coated with a pressure sensitive material layer (28, 30).

39 Claims, 4 Drawing Sheets

FORCE SENSOR

RELATED APPLICATION

This application is a continuation of International Application No. PCT/EP99/06593, filed Sep. 7, 1999 entitled FORCE SENSOR which is incorporated herein in its entirety by reference.

FIELD OF THE INVENTION

The present invention relates to a force sensor of the type using an electric resistance that varies according to the applied force.

BACKGROUND OF THE INVENTION

Force or pressure sensors whose electric resistance varies with the applied force are known as FSRs (force sensing resistors) and make possible a direct determination of the force applied to the active surface of the sensor.

Such sensors are, for example, described in the documents EP 0 649 518 and U.S. Pat. No. 4,314,227. They comprise two flexible supporting sheets of insulating material which are arranged opposite each other and separated by a certain distance by means of an intercalated separator. The separator comprises, for example, a two-sided adhesive band which is cut in such a way as to surround at least partly the active zone of the sensor. Inside the active zone, one of the supporting sheets is provided with two electrode structures made of a conducting material and separated from each other, while the other supporting sheet is provided with a coating of a pressure-sensitive semiconducting or resistive material. The semiconducting or resistive material may either have an internal resistance that decreases when the layer is compressed, or may have microprojections on the surface so that the surface resistance between the layer and a conductor decreases when the layer is pressed on to the conductor.

When no pressure is acting on the pressure sensor, the layer of semiconducting material is not in contact with the two electrodes and the electric resistance between the two electrodes is consequently very high. If, on the contrary, a pressure is applied to the sensor, the two supporting sheets are pressed together and the pressure-sensitive layer is put into contact with the two electrodes. This produces, between the two electrodes, a short circuit whose electric resistance varies inversely with the value of the applied pressure. The greater the pressure on the sensor, the more the semiconducting layer is compressed or the more it comes into intimate contact with the electrodes, and the more the resistance measured between the two electrodes decreases.

In a mode of execution of the sensor according to the document U.S. Pat. No. 4,314,227, each electrode comprises fingers extending from a main conducting structure, said fingers of the two electrodes being arranged so that they mesh with each other. Both electrodes are coated with a layer of semiconducting material, while the other supporting sheet is provided with a coating of conducting material. Such a sensor has a very good dynamic range due to the many points of contact between the coating of conducting material and the layer of pressure-sensitive material on the fingers of the two electrodes. The alternating arrangement of the fingers of the two electrodes, on the other hand, causes problems related to the tolerances in production. In fact, because of the small distance between two neighbouring fingers, variations in the production of this type of sensor often bring about short circuits between the two electrodes, thus making the sensors unusable.

It follows that the tolerances allowed in the production of these sensors are very restrictive, which makes the production slow and costly.

The objective of the present invention is to propose a force sensor which is less sensitive to variations in production.

SUMMARY OF THE INVENTION

This objective is attained by a force sensor comprising two electrodes made of a conducting material, which are arranged so that they are separated from each other on a first insulating support, each of said two electrodes being coated with a layer of pressure-sensitive material, the two layers of pressure-sensitive material being electrically insulated from each other, and a contact element made of a conducting material is arranged at a certain distance from the two electrodes, said contact element being pressed against said electrodes when a force is exerted on the force sensor. In conformity with the invention, each electrode comprises a conductor arranged substantially on the periphery of an active zone of the sensor and the layer of pressure-sensitive material covering each electrode extends towards the interior of the active zone, the two pressure-sensitive layers being separated by an interstice that passes substantially through the center of the active surface.

Although such a sensor has a dynamic range slightly smaller than that of sensors known in the present state of the art, its dynamic range is good enough for many applications where such a good dynamic range is not essential. On the other hand, because of the well-separated arrangement of the electrodes, short circuits between the electrodes caused by variations in production are significantly reduced in comparison with those in sensors of the present state of the art. The only short circuits that may be produced are those between the pressure-sensitive layers. However, because of the very high specific resistance of these short circuits between the pressure-sensitive layers, with a value above the operational threshold of the sensor, any possible short circuits do not interfere with the proper functioning of the sensor.

Consequently, the production tolerances for such a sensor may be less strict, which allows production to be faster. Moreover, the production of sensors not conforming to the specifications is significantly reduced, which increases the productivity of the production line.

In addition to the aforesaid advantages, the use of the pressure-sensitive layer to cover the electrodes protects the surfaces of said electrodes against contact with air. This eliminates a serious problem posed by the use of electrodes that are slowly oxidised when they are exposed to air.

The layer of pressure-sensitive material may comprise either microprojections on the surface, so that the surface resistance between the layer and the contact element decreases with the pressure exerted on the junction between the layer and the contact element, or a material whose specific resistance varies inversely with the compression of said material, or a combination of the two. It may for example involve a semiconducting polymer or a conducting elastomer.

In order to adapt the dynamic range and sensitivity of such a sensor to the specific requirements of an application, the layer of pressure-sensitive material preferably comprises inclusions of conducting material, said inclusions of conducting material being arranged in such a way as to change the specific resistance of the layer of pressure-sensitive material. This forms a very significant advantage if one wishes to manufacture several sensors with different sensitivities on the same support, particularly for the manufacture of seat-occupancy detectors, which comprise several force sensors arranged alongside each other on a sheet. Such a manufacture then becomes possible without having to use different pressure-sensitive materials for the different sensitivities. It is sufficient to vary the number and the placing of the inclusions adequately in order to achieve the desired sensitivity.

The sensitivity of each force sensor can therefore be adjusted by a modification of the geometrical arrangement of its various components. In this way, the sensitivity can be adapted over a wide range to all requirements and, in particular, it becomes easily reproducible, i.e. it would be very easy to provide an exact reproduction of a required sensitivity. Moreover, the sensitivity of the cell becomes largely independent of the thickness of the layer of pressure-sensitive material, which makes possible a further increase in the speed of manufacture of the sensors.

The contact element of conducting material preferably comprises a layer of conducting material, graphite for example, applied to a second flexible support. The second support is then placed at a distance from said first support by means of a separator located outside an active zone, so that in the interior of said active zone the layer of conducting material is opposite said electrodes. Said separator advantageously comprises a printable adhesive which serves to stick said first substrate to said second substrate. The adhesive may, for example, be applied by serigraphy, just like the electrodes and the layers of pressure-sensitive material, or by spray printing. After printing the adhesive and assembling the two supports, the adhesive is hardened, for example, by baking.

The use of a printable adhesive allows great freedom in the design of force sensors, particularly during the manufacture of a set of sensors on one substrate, like seat-occupancy detectors. In fact, until now, a two-sided adhesive band has generally been used as a separator. This adhesive band was cut before assembly, so that it had cut-out sections in the shape of active zones at places which, after assembly of the sensor, corresponded to its active zones. In order to provide, in the assembled sensor, ventilation chambers connecting the active zones with the environment and thus allowing an equalisation of pressure between the active zones and the environment, these cut-out sections must partly be connected by thin cut-out sections. This practice clearly results in quite strict limitations on the design of detectors since, after application of the cut-out sections of the separator, the latter must still form a single piece in order that it can be manipulated during the assembly of the detector. Moreover, its shape must be adapted so that a protective sheet can easily be removed from the adhesive surfaces.

All such limitations on the shape of the separator no longer occur when the latter is simply printed by a suitable technique on a substrate or substrates before their assembly.

In order to ensure a uniform spacing of the two supports over the whole extent of the sensor, separator particles with a diameter substantially equal to the desired spacing of the two substrates are preferably arranged inside said printable adhesive. These separator particles may be mixed in the liquid adhesive and applied together with it, or they may be introduced into the adhesive after it has been applied.

The force sensor as described above is thus particularly well suited to the manufacture of seat-occupancy detectors, comprising one or more force sensors. It allows a fast and highly productive production of such occupancy detectors while minimising production losses. Since the manufacturing process has largely eliminated constraints on the design of the detectors, it could easily be adapted to minimise the losses of substrate by offcuts, for example.

BRIEF DESCRIPTION OF THE DRAWINGS

Other special features and characteristics of the invention will emerge from the detailed description of several advantageous modes of execution given below as illustrative examples with reference to the appended drawings. These drawings show.

DETAILED DESCRIPTION

Figure 1:
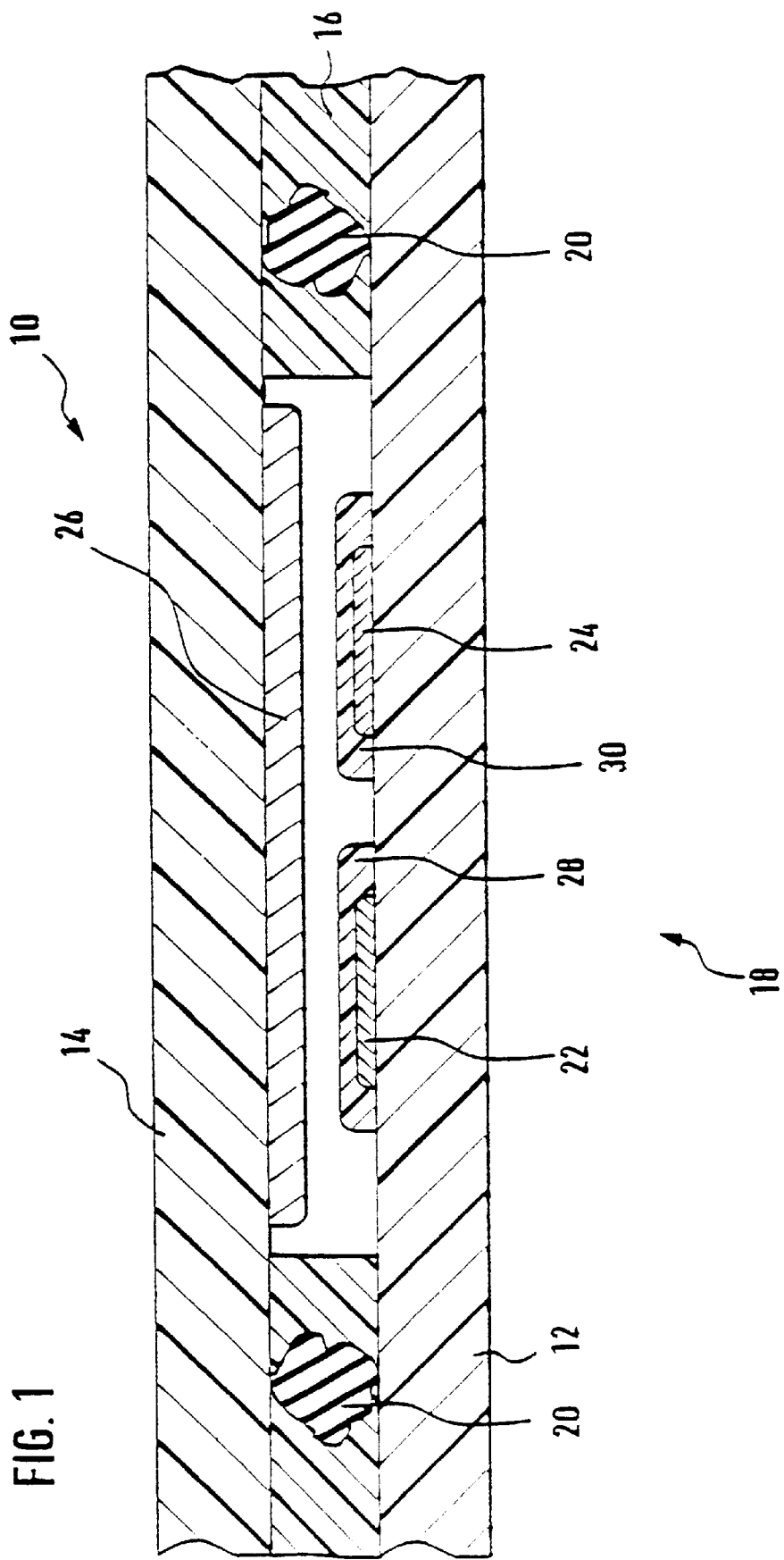
FIG. 1: a transverse section through an advantageous execution of a force sensor.

A transverse section through an advantageous execution of a force sensor according to the present invention is shown in FIG. 1. The force sensor 10 comprises a first insulating support 12 and a second support 14, for example sheets of PET, PES, PEN, PEI, PI, etc., which are arranged opposite each other and at a certain distance from each other determined by an intercalated separator 16. The separator may comprise a two-sided adhesive band which is cut so as to surround, at least in part, the active zone 18 of the sensor 10. In a preferred version, on the other hand, the separator comprises an adhesive that is printable, for example by serigraphy or by spraying, which serves to stick the two supports 12 and 14 together and which is solidified before or after assembly of the supporting sheets. In order to ensure a uniform spacing between the two supports, separator particles 20 with a diameter substantially equal to the planned spacing between the two supports 12, 14 may be introduced into the adhesive, either before or after its application.

In the interior of the active zone 18, the first supporting sheet 12 is provided with two electrode structures 22, 24 made of a conducting material, silver for example, separated from each other and preferably printed by serigraphy on the support 12. The second supporting sheet 14 is provided with a contact element 26 made of a conducting material. It may, for example, be simply a layer of graphite or of metal which is printed, laminated or engraved on the second support 14.

In order to give the sensor a resistance that varies with the pressure exerted on its active zone, at least one of the sensor electrodes is coated with a pressure-sensitive semiconducting or resistive material. This semiconducting or resistive material may either have an internal resistance that decreases when the layer is compressed or may have microprojections on its surface, so that the surface resistance between the layer and a conductor decreases when the layer is pressed against the conductor. In the first case, the sensitivity of the sensor depends on a surface effect; in the second case, it depends on a volume effect. It may involve, for example, a semiconducting polymer or a conducting elastomer.

In the mode of execution shown in FIGS. 1 and 2, the two electrodes 22 and 24 are coated with a layer 28 or 30 respectively of a pressure-sensitive semiconducting or resistive material, the two coatings 28 and 30 being electrically insulated from each other.

When a force is exerted on the active zone 18 of the sensor 10, the two supporting sheets 12 and 14 are pressed together and the conducting element 26 is put into contact with the coatings 28 and 30 of the two electrodes. An electrical contact is thus formed between the two electrodes, whose resistance depends either on the surface resistance at the junction between the pressure-sensitive layer and the contact element, or on the specific resistance of the semiconducting or resistive material of the layers 28 and 30. In both cases, i.e. for both types of pressure-sensitive material, the resistance in question decreases when the applied force increases.

Figure 2A:
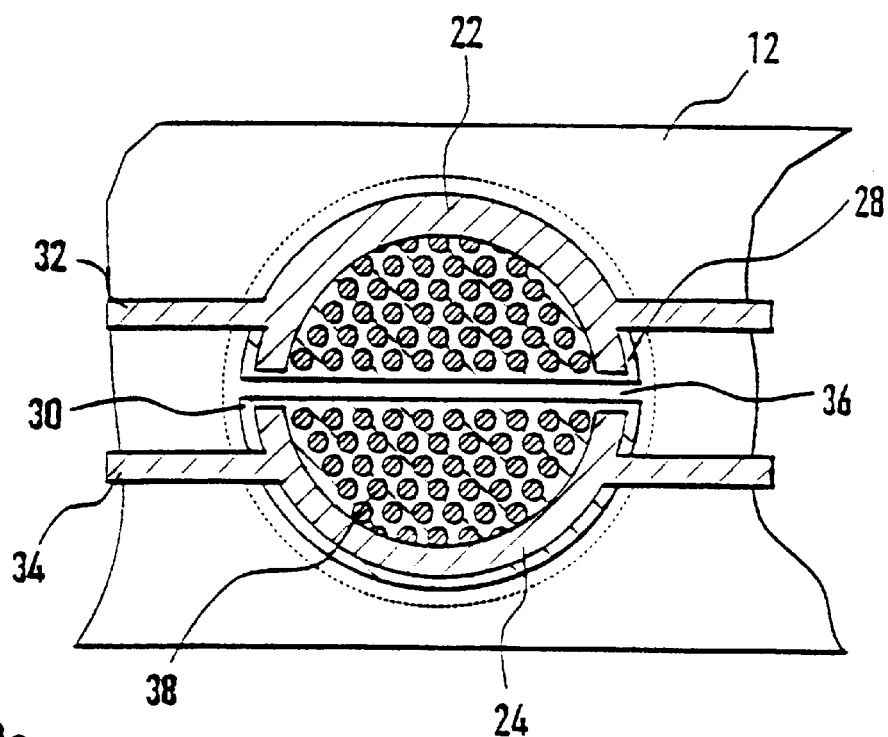
FIGS. 2a and 2b: a view, on the first substrate, of two modes of execution of a force sensor.
Figure 2B:
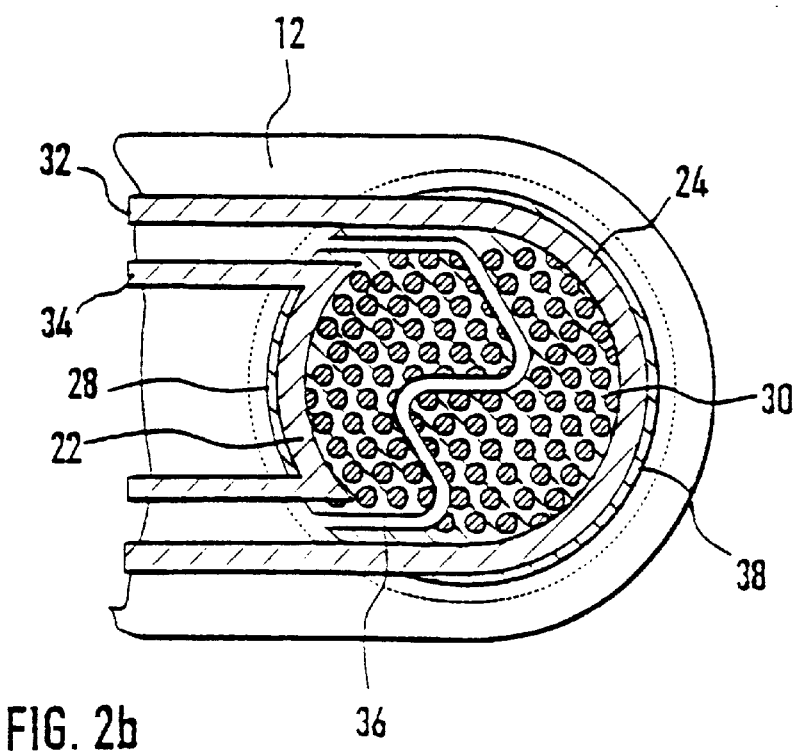

Several modes of execution of the electrodes are represented in FIG. 2. The two sensors represented comprise electrodes 22 and 24 in the form of simple conducting lines arranged along the periphery of the active zone of the sensor. Connected to these conducting lines are the conductors 32 and 34 respectively, required to connect the sensor to a control unit or to connect it in series or in parallel with another sensor. For the sensor shown in FIG. 2a, these conductors extend over both sides of the sensor, since this is a sensor arranged in the center of a band comprising several sensors connected in parallel, as used in seat-occupancy detectors. The sensor shown in FIG. 2b is one that is, for example, arranged at the end of such a band.

In this mode of execution, the layers 28 and 30 of pressure-sensitive material covering the electrodes extend towards the interior of the active zone to be separated by an interstice 36 that passes roughly through the center of the active surface. The distance between the effective contact surfaces may therefore be very small but without the need to bring the electrodes close to each other. The electrodes may thus have a gap between them that is significantly greater than that in the version with fingers. This considerably reduces the direct short circuits between the electrodes due to variations in production and hence reduces the production of sensors not conforming to the specifications.

The only short circuits that may be produced are those between the two pressure-sensitive layers 28 and 30. However, because of the very high specific resistance of such short circuits between the pressure-sensitive layers, with a value above the operational threshold of the sensor, these possible short circuits do not affect the proper functioning of the sensor.

In order to adapt the dynamic range and sensitivity of the sensor to the specific requirements of an application, the layer 28, 30 of pressure-sensitive material preferably comprises inclusions of conducting material. These may for example be specks of silver or another metal, which are printed simultaneously with the electrode conductors. Said inclusions 38 of conducting material are arranged in such a way as to modify the specific resistance of the layer of pressure-sensitive material 28, 30. In another mode of execution, the specks of metal and the electrodes could be simultaneously engraved by the chemical etching of a metal layer deposited on the substrate.

This possibility of varying the sensitivity is a very considerable advantage in the manufacture of seat-occupancy detectors, which comprise several force sensors arranged alongside each other on a sheet. Such a detector is represented diagrammatically in FIG. 3.

It comprises several force sensors 10 arranged in a plane and connected by their supporting sheets 12 or 14. Depending on they way they detect occupancy, the individual sensors 10 may be connected either in parallel or in a matrix array consisting of a number of conductors in rows and columns.

During the manufacture of such a detector, the electrodes of the different individual sensors 10 are printed on a first sheet of substrate together with the conductors connecting the sensors to each other and a connecting terminal 40. If the need arises, the specks of silver 38 are printed at the same time. The pressure-sensitive layers are then printed on the electrodes at appropriate places.

During this time, the graphite conducting elements are printed on a second sheet of substrate, followed by the printable adhesive used as a separator. In cases where the adhesive does not include separator particles, these are introduced immediately after the application of the adhesive.

The two supporting sheets are then assembled while adjusting their relative positions so that the contact elements on the second support are exactly opposite the electrodes and pressure-sensitive layers on the first support. Lastly, the finished detector is cut from the sandwich produced in this way.

In another very advantageous method of manufacture, the silver electrodes and the conducting elements are printed simultaneously on two adjacent zones of the same substrate sheet, thus avoiding an extra stage of printing. In a second stage of printing, it is then possible to print the pressure-sensitive layer and the adhesive on the supporting sheet, the pressure-sensitive layer being printed at appropriate places in the zone of the electrodes and the adhesive being printed at appropriate places in the zone of the conducting elements. Lastly, the sensor is assembled by folding the two zones together along a line of separation of the two adjacent zones, and the finished detector is cut from this sandwich. It should be noted that the supporting sheet may be cut along the line of separation before the folding of one zone on the other.

The printing of all the layers of the sensor to be manufactured on a single supporting sheet makes it possible to define very precise reference points in the two zones, which later may be used to adjust the positions of the two supporting sheets or the two zones of the supporting sheet relative to each other. This significantly improves the precision with which the two supporting sheet zones can be assembled ("matching") and hence leads to sensors with very low production tolerances. As a result, the production of sensors not conforming to specifications is significantly reduced, thus increasing the productivity of the production line.

It should be noted that, for both methods of manufacture, the sensor according to the present invention makes possible a quick and easy on-line control of the printing quality of the pressure-sensitive layer. Printing this layer on the electrode conductors makes it possible, without an extra stage of printing, to create test zones on the supporting sheet in which a layer with a predetermined shape and area is printed between two conducting segments. The test is then reduced to a single measurement of the resistance of this layer between two conducting segments and hence it is easily possible to monitor the conformity of the pressure-sensitive layer to the specifications. By creating these test zones at several places on the sheet, it is possible, in a similar way, to monitor the uniformity of the printing of this layer over the whole surface of the sheet. In this way, the quality of the sensors produced can therefore be monitored before their final assembly.

Thanks to the use of the silver specks 38 to adjust the sensitivity of the individual sensors, it becomes possible to produce seat-occupancy detectors with zones of different sensitivities without having to use different pressure-sensitive materials. In effect, the sensitivity of each force sensor may be adjusted by a modification in the number and geometrical positioning of the inclusions 38 in the respective pressure-sensitive layer.

Figure 3:
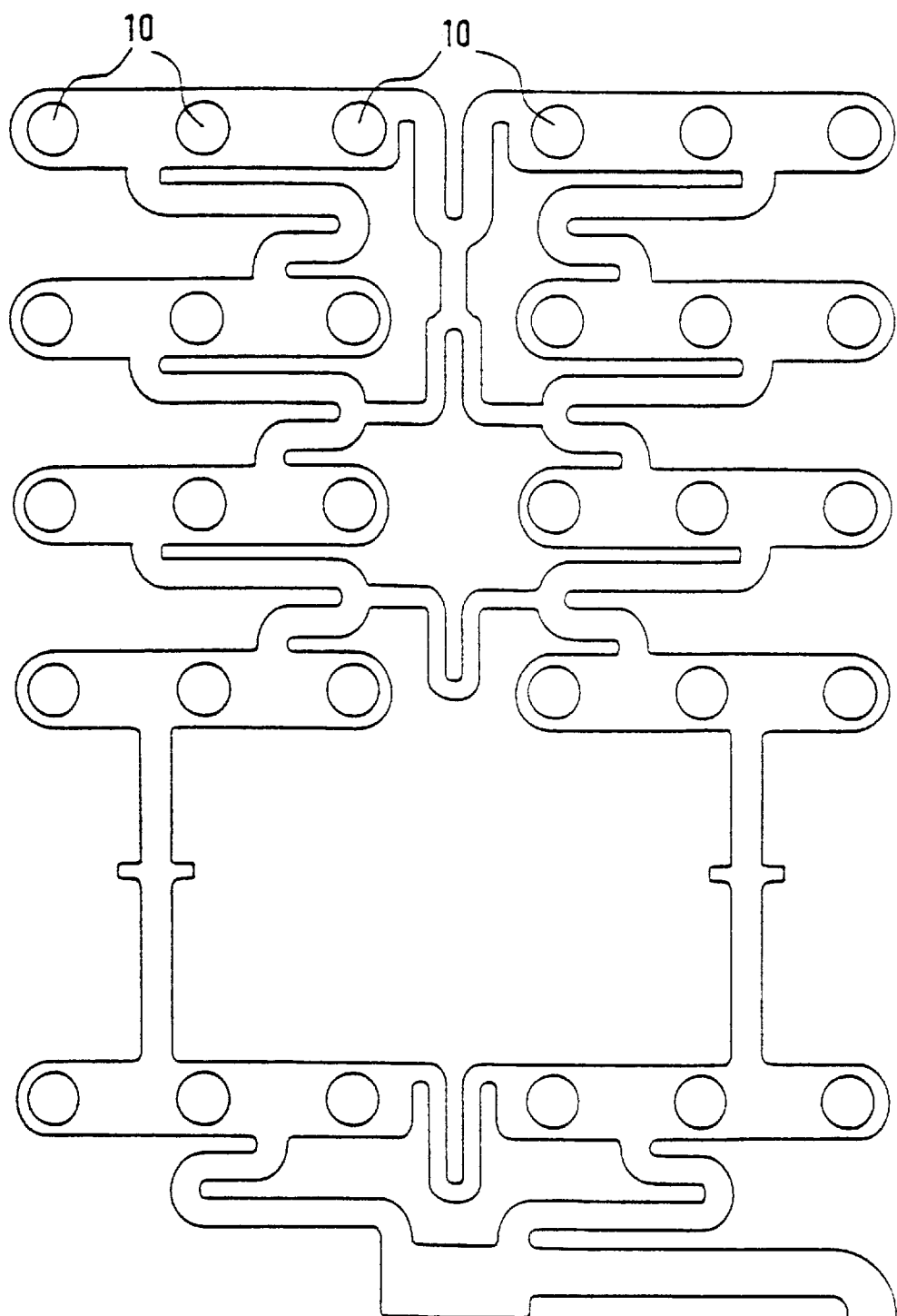
FIG. 3: a diagrammatic plan view of a seat-occupancy detector.
Figure 4:
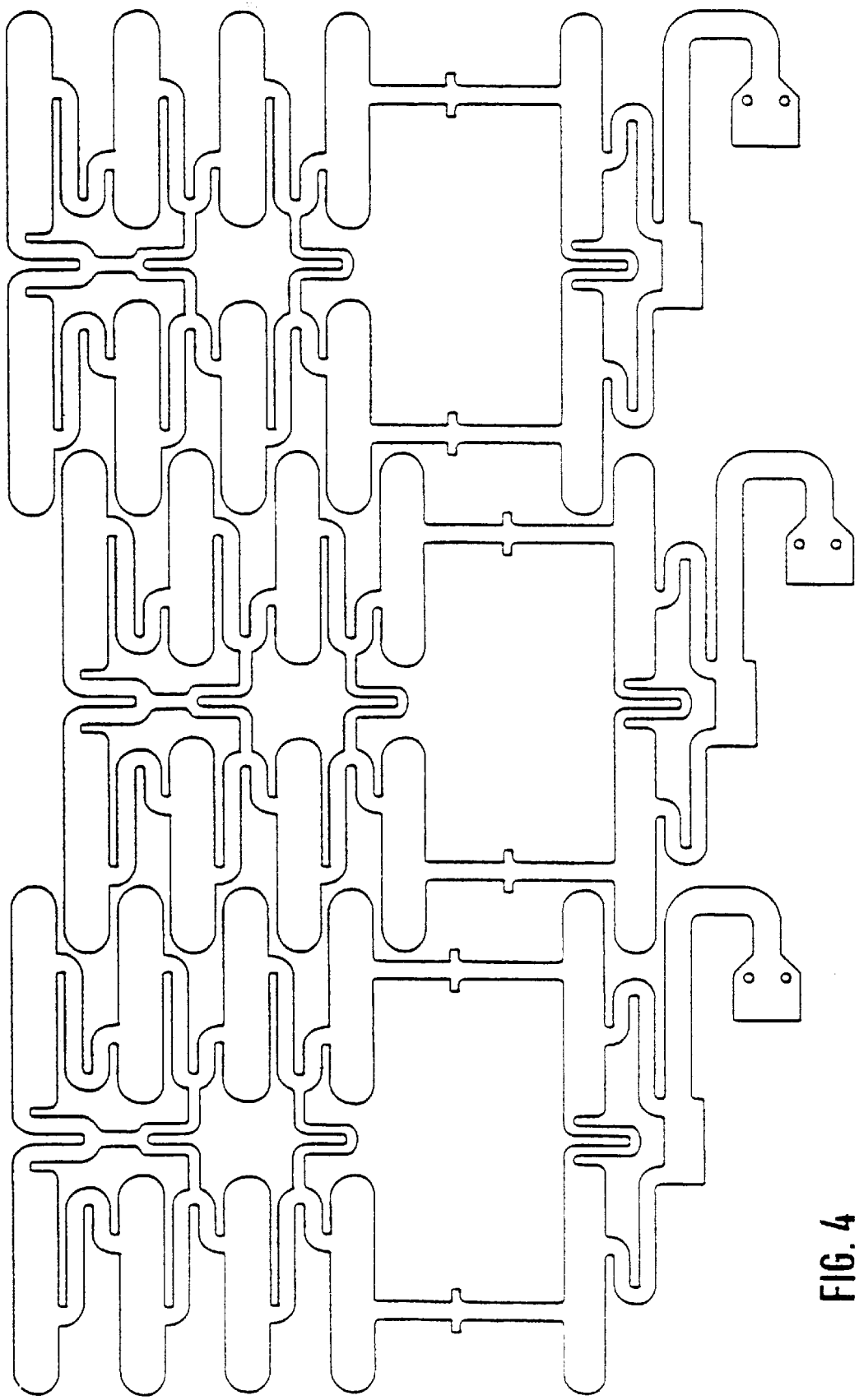
FIG. 4: the arrangement of several seat-occupancy detectors during their manufacture.

In addition, and as described above, the use of an adhesive allows great freedom in the design of seat-occupancy detectors. The shape of the detector can then be optimised in order to reduce losses of material during the cutting of the detector. Such a shape for the detector is shown in FIG. 3. It enables several detectors to be produced from a single substrate sheet, while minimising offcuts by a suitable arrangement of the detectors on the sheet. Such an arrangement, in which adjacent detectors mesh with each other, is shown for example in FIG. 4.

What is claimed is:

1. Force sensor comprising:
    two electrodes made of a conducting material, said two electrodes being arranged on a first insulating support in such a way that they are separated from each other, each of said two electrodes being coated with a layer of pressure-sensitive material, the two layers of pressure-sensitive material being electrically insulated from each other, and
    a contact element made of a conducting material, said contact element being arranged at a certain distance from said two electrodes, said contact element being pressed against said electrodes when a force is exerted on the force sensor, wherein
    each electrode comprises a conductor arranged at a periphery of an active zone of the sensor, and wherein said layer of pressure-sensitive material covering each electrode covers the conductor of the electrode and extends from said conductor towards the interior of the active zone, the two pressure-sensitive layers being separated by an interstice interposed centrally in the active zone.

2. Force sensor according to claim 1, wherein said pressure-sensitive layer comprises microprojections on a surface of said layer, so that a surface resistance between said layer and the contact element decreases with the pressure exerted on the junction between the layer and the contact element.

3. Force sensor according to claim 1, wherein said pressure-sensitive material comprises a material whose specific resistance varies inversely with a compression of said material.

4. Force sensor according to claim 2, wherein said pressure-sensitive material comprises a material whose specific resistance varies inversely with a compression of said material.

5. Force sensor according to claim 1, wherein the layer of pressure-sensitive material comprises inclusions of conducting material, said inclusions of conducting material being arranged so as to change the specific resistance of the layer of pressure-sensitive material.

6. Force sensor according to claim 1, wherein said contact element comprises a layer of conducting material applied to a second flexible support, said second support being arranged at a distance from said first support by means of a separator located outside of said active zone so that, in the interior of said active zone, the layer of conducting material is opposite said electrodes.

7. Force sensor according to claim 6, wherein said separator comprises a printable adhesive, said adhesive serving to stick said first insulating support to said second support.

8. Force sensor according to claim 7, comprising separator particles arranged inside said printable adhesive, said particles having a dimension extending between said supports which corresponds to a spacing between said supports defined by said separator.

9. Seat-occupancy detector comprising at least one force sensor according to claim 1.

10. The force sensor of claim 1 wherein said two electrodes are metal electrodes and said pressure sensitive material is of a semi-conductor material.

11. The force sensor of claim 1 wherein said pressure sensitive material covering said electrodes extends inward between opposing interior sides of said two electrodes to define the interstice.

12. The force sensor of claim 11, wherein the pressure sensitive material covering said electrodes is arranged so as to define an interstice with a common width along an extension length of said interstice through the active zone.

13. The force sensor of claim 1 wherein said electrodes have opposing curved interior surfaces and the pressure sensitive material covering said electrodes extends over an upper surface of said electrodes and radially inward from the opposing curved interior surfaces to a central area of an area bordered by the opposing curved interior surface of said electrodes.

14. The force sensor of claim 1 further comprising a first conductor line extending to a first of said electrodes and a second conductor line extending to a second of said two electrodes wherein said first and second conductor lines provide means for connecting said electrodes to a sensor control unit.

15. Force sensor comprising:
    two separate electrodes made of a conducting material, said electrodes being arranged on a first insulating support at a periphery of an active zone of said sensor, each of said two electrodes being coated with a layer of pressure-sensitive material, said layers of pressure-sensitive material extending from the respective electrode towards the interior of the active zone and being separated by an interstice interposed centrally in the active zone, and
    a contact element made of a conducting material, said contact element being arranged at a certain distance from said two electrodes, said contact element being pressed against said electrodes when a force is exerted on the force sensor.

16. Force sensor according to claim 15, wherein said pressure-sensitive layer comprises microprojections on a surface of said layer, so that a surface resistance between said layer and the contact element decreases with the pressure exerted on the junction between the layer and the contact element.

17. Force sensor according to claim 15, wherein said pressure-sensitive material comprises a material whose specific resistance varies inversely with a compression of said material.

18. Force sensor according to claim 15, wherein the layer of pressure-sensitive material comprises inclusions of conducting material, said inclusions of conducting material being arranged so as to change the specific resistance of the layer of pressure-sensitive material.

19. Force sensor according to claim 15, wherein said contact element comprises a layer of conducting material applied to a second flexible support, said second support being arranged at a distance from said first support by means of a separator located outside of said active zone so that, in the interior of said active zone, the layer of conducting material is opposite said electrodes.

20. Force sensor according to claim 19, wherein said separator comprises a printable adhesive, said adhesive serving to stick said first insulating support to said second support.

21. Force sensor according to claim 20, comprising separator particles arranged inside said printable adhesive, said separator particles having a dimension extending between said supports which corresponds to a spacing between said supports defined by said separator.

22. Seat-occupancy detector comprising at least one force sensor according to claim 15.

23. The force sensor of claim 15 wherein said two electrodes are metal electrodes and said pressure sensitive material is of a semi-conductor material.

24. The force sensor of claim 15 wherein said pressure sensitive material covering said electrodes extends inward between opposing interior sides of said two electrodes to define the interstice.

25. The force sensor of claim 24 wherein the pressure sensitive material covering said electrodes is arranged so as to define an interstice with a common width along an extension length of said interstice through the active zone.

26. The force sensor of claim 15 wherein said electrodes have opposing curved interior surfaces and the pressure sensitive material covering said electrodes extends over an upper surface of said electrodes and radially inward from the opposing curved interior surfaces to a central area of an area bordered by the opposing interior curved surfaces of said electrodes.

27. The force sensor of claim 15 further comprising a first conductor line extending to a first of said two electrodes and a second conductor line extending to a second of said two electrodes wherein said first and second conductor lines provide means for connecting said electrodes to a sensor control unit.

28. Force sensor comprising:
two electrodes made of a conducting material, said two electrodes being arranged on a first insulating support in such a way that they are separated from each other, each of said two electrodes being coated with a layer of pressure-sensitive material, the two layers of pressure-sensitive material being electrically insulated from each other, and
a contact element made of a conducting material having a conductivity which is higher than a conductivity of the pressure sensitive material, said contact element being arranged at a certain distance from said two electrodes, said contact element being pressed against said layers of pressure-sensitive material on said electrodes when a force is exerted on the force sensor, and wherein each electrode comprises a conductor arranged at a periphery of an active zone of the sensor, and wherein said layer of pressure-sensitive material covering each electrode covers the conductor of the electrode and extends from said conductor towards the interior of the active zone, the two pressure-sensitive layers being separated by an interstice interposed centrally in the active zone.

29. The force sensor of claim 28 wherein said two electrodes are metal electrodes and said pressure sensitive material is of a semi-conductor material.

30. The force sensor of claim 28 wherein said pressure sensitive material covering said electrodes extends inward between opposing interior sides of said two electrodes to define the interstice.

31. The force sensor of claim 30 wherein the pressure sensitive material covering said electrodes is arranged so as to define an interstice with a common width along an extension length of said interstice through the active zone.

32. The force sensor of claim 28 wherein said electrodes have opposing curved interior surfaces and the pressure sensitive material covering said electrodes extends over an upper surface of said electrodes and radially inward from the opposing curved interior surfaces to a central area of an area bordered by the opposing curved interior surfaces of said electrodes.

33. The force sensor of claim 28 further comprising a first conductor line extending to a first of said two electrodes and a second conductor line extending to a second of said two electrodes wherein said first and second conductor lines provide means for connecting said electrodes to a sensor control unit.

34. Force sensor comprising:
two separate electrodes made of a conducting material, said electrodes being arranged on a first insulating support at a periphery of an active zone of said sensor, each of said two electrodes being coated with a layer of pressure-sensitive material, said layers of pressure-sensitive material extending from the respective electrode towards the interior of the active zone and being separated by an interstice interposed centrally in the active zone, and
a contact element made of a conducting material having a conductivity which is higher than a conductivity of the pressure sensitive material, said contact element being arranged at a certain distance from said two electrodes, said contact element being pressed against said layers of pressure-sensitive material on said electrodes when a force is exerted on the force sensor.

35. The force sensor of claim 34 wherein said two electrodes are metal electrodes and said pressure sensitive material is of a semi-conductor material.

36. The force sensor of claim 34 wherein said pressure sensitive material covering said electrodes extends inward between opposing interior sides of said two electrodes to define the interstice.

37. The force sensor of claim 34 wherein the pressure sensitive material covering said electrodes is arranged so as to define an interstice with a common width along an extension length of said interstice through the active zone.

38. The force sensor of claim 34 wherein said electrodes have opposing curved interior surfaces and the pressure sensitive material covering said electrodes extends over an upper surface of said electrodes and radially inward from the opposing curved interior surfaces to a central area of an area bordered by the opposing curved interior surfaces of said electrodes.

39. The force sensor of claim 34 further comprising a first conductor line extending to a first of said two electrodes and a second conductor line extending to a second of said two electrodes wherein said first and second conductor lines provide means for connecting said electrodes to a sensor control unit.

* * * * *